United States Patent

Dillard

Patent Number: 5,230,178
Date of Patent: Jul. 27, 1993

[54] THREADED RATTLE CAPSULE

[76] Inventor: Nick Dillard, 5805 Annette, Shreveport, La. 71105

[21] Appl. No.: 901,700

[22] Filed: Jun. 22, 1992

[51] Int. Cl.⁵ .............................. A01K 83/06
[52] U.S. Cl. ..................... 43/44.8; 43/42.31; 43/44.2
[58] Field of Search ............ 43/44.8, 42.31, 44.2

[56] References Cited

U.S. PATENT DOCUMENTS

| | | | |
|---|---|---|---|
| 4,203,246 | 5/1980 | Sacharnoski | 43/42.31 |
| 4,334,381 | 6/1982 | Carver | 43/44.8 |
| 4,785,569 | 11/1988 | Thomas | 43/42.31 |
| 4,969,287 | 11/1990 | Johnson | 43/44.8 |
| 5,001,856 | 3/1991 | Gentry | 43/42.31 |
| 5,038,513 | 8/1991 | Hardin | 43/44.8 |
| 5,117,575 | 6/1992 | Desmond | 43/44.8 |

FOREIGN PATENT DOCUMENTS 0612576  8/1979  Switzerland ............ 43/44.2

Primary Examiner—Kurt C. Rowan
Attorney, Agent, or Firm—John M. Harrison

[57] ABSTRACT

A threaded rattle capsule which is designed for attachment to a hook and threadable insertion in a flexible plastic lure or other flexible lure such as pork rind or the like, for use in fishing. In a first preferred embodiment the threaded rattle capsule includes a cap ring at the unthreaded end for mounting in the eye of a hook and insertion in a flexible lure, wherein the barb of the hook is also inserted in the lure. In another preferred embodiment the unthreaded end of the threaded rattle capsule is provided with a connecting mechanism for attachment to the hook shank and is threaded in a lure such that the lure trails the hook during retrieval.

20 Claims, 1 Drawing Sheet

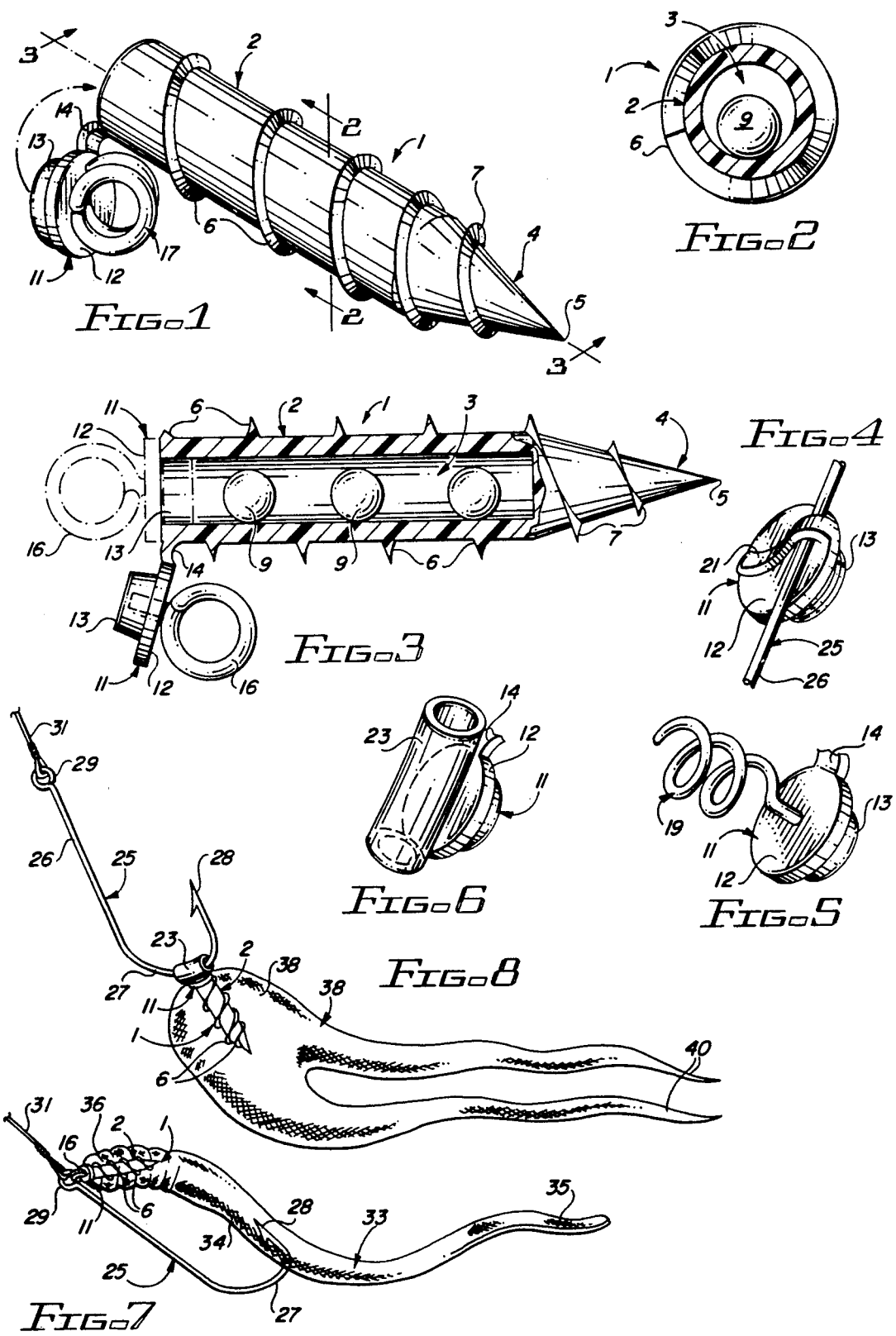

THREADED RATTLE CAPSULE

BACKGROUND OF THE INVENTION

Field of the Invention

This invention relates to rattle capsules for lures and more particularly, to a threaded rattle capsule designed for threadable insertion in a flexible lure such as a flexible plastic worm, pork rind trailer or the like, for retrieval of the lure. In a first preferred embodiment the threaded rattle capsule is configured with a tapered, threaded nose cone attached to a threaded body portion having a hollow interior which receives one or more rattle balls. The opposite end of the capsule is typically closed by a cap which may be hinged to the capsule and receives a device for mounting on a hook. The mounting device is typically a cap ring for mounting on the eye of a hook, such that the threaded rattle capsule may be inserted in the head or body of a flexible lure such as a flexible plastic worm or pork rind. The hook barb may also be inserted in the lure for retrieval of the lure in a selected lure configuration. Alternatively, the cap end of the threaded rattle capsule may be fitted with a suitable shaped receiving member for receiving the shank of a hook and the threaded end of the threaded rattle capsule inserted in the lure, typically a strip of pork rind or the like, for retrieving the lure. Other hook-receiving members that may be attached to or formed integrally with the cap end of the threaded rattle capsule are a clip, cap spiral, cap tube and a cap corkscrew, in non-exclusive particular.

Various types of rattle capsules are well known in the art for insertion in soft plastic lures such as plastic worms, grubs, crawfish and the like. These rattle capsules are typically constructed of plastic or glass and are filled with several lead or steel shot to effect the desired rattling action. The vials or tubes are then pressed into the soft plastic body of the flexible plastic fishing lure and the lure is retrieved in conventional fashion to impart a fish-attracting rattling action or noise while submerged.

One of the problems associated with rattle capsules of this design is the tendency of these capsules to exit the body of the flexible plastic lure along the entrance route during lure retrieval. Furthermore, under circumstances where such lures are lost to a fish, as is sometimes the case when the flexible plastic lure is pulled from the hook and the fish fails to bite the hook, the entire lure, as well as the rattle capsule, is lost and another rattle capsule must be inserted in a substitute lure. This occurrence requires replacement of the lure, insertion of another rattle capsule and threading of the lure on the hook. Thus valuable time is lost, especially during tournament fishing. Furthermore, conventional rattle capsules serve only the function of providing a rattling action to soft, flexible plastic lures, since the rattle capsules are not subject to use other than by insertion in the bodies of these lures. It is therefore desirable to provide a rattle capsule which is capable of being inserted and maintained in any portion of a flexible plastic lure and in the head or lead portion of other flexible lures such as pork rind, without inadvertent loss of the rattle capsule during lure retrieval and in a minimum of time.

It is therefore an object of this invention to provide a new and improved threaded rattle capsule which may be threadably inserted in the body of a flexible plastic lure to impart a rattling action in the lure.

Another object of this invention is to provide a threaded rattle capsule which is characterized by a capsule cylinder fitted with a cone-shaped insertion end, with threads provided on the insertion end and the cylinder and a hollow interior formed in the cylinder for receiving one or more rattle balls and a cap or plug sealing the opposite end of the capsule cylinder from the cone-shaped insertion end. Various connecting devices may be attached to the cap end of the capsule cylinder, including a cap ring, a cap clip, a cap spiral, a corkscrew and a cap tube, in non-exclusive particular, depending upon the desired use to be made of the threaded rattle capsule.

Still another object of this invention is to provide a new and improved threaded rattle capsule which is characterized by a hollow capsule cylinder having at least two rattle balls therein and terminated at one end by a tapered cone and at the other end by a plug or end cap and having threads extending from the cone throughout the length of the cylinder, with a cap ring provided on the end cap or plug of the capsule cylinder for attachment to the eye of a hook, such that the capsule cylinder may be threadably inserted in the head of a flexible plastic lure, the barb of the hook inserted in the lure body and a retrieving line tied to the eye of the hook for retrieval of the lure and imparting a rattling action to the lure during retrieval.

Still another object of this invention is to provide a threaded rattle capsule which includes a cylindrical capsule body terminated at one end by a cone and at the opposite end by a plug or cap fitted with a cap tube or alternative member for receiving the shank of a hook, the capsule cylinder further including a hollow interior for receiving at least two rattle balls, wherein the capsule cylinder is threadably inserted in a flexible lure and the shank of a hook is inserted through the cap tube or receiving member to facilitate trailing the lure behind the hook during retrieval.

SUMMARY OF THE INVENTION

These and other objects of the invention are provided in a new and improved threaded rattle capsule characterized by a hollow capsule cylinder terminated at one end by a tapered nose cone and at the other end by a hinged plug or end cap with spiral threads provided at least on the cone and optionally on the capsule cylinder and a hook-engaging member fitted to or formed integrally with the cylinder cap, wherein the capsule cylinder and cone may be threadably inserted in a flexible fishing lure such as a flexible plastic worm, pork rind or the like and the attachment member secured to a hook to facilitate retrieval of the lure, wherein a rattling action is imparted to the lure during retrieval.

BRIEF DESCRIPTION OF THE DRAWING

The invention will be better understood by reference to the accompanying drawing, wherein:

FIG. 1 is a perspective view of a preferred embodiment of the threaded rattle capsule of this invention fitted with a hinged cylinder cap having a cap spiral member for attaching the threaded rattle capsule to a hook;

FIG. 2 is a transverse sectional view taken along line 2—2 of the threaded rattle capsule illustrated in FIG. 1;

FIG. 3 is a longitudinal sectional view taken along 3—3 of the threaded rattle capsule illustrated in FIG. 1;

FIG. 4 is a perspective view of a threaded cap element having a hook-engaging clip element and designed for threadably closing one end of the threaded rattle capsule illustrated in FIG. 1;

FIG. 5 is an alternative plug-type cylinder cap fitted with a corkscrew for attaching a hook to the threaded rattle capsule illustrated in FIG. 1;

FIG. 6 is a perspective view of an alternative plug-type cylinder cap fitted with a cap tube for receiving a shank of a hook and mounting the threaded rattle capsule on a lure in trailering configuration;

FIG. 7 is a perspective view of a first preferred technique for mounting the threaded rattle capsule on a hook and in the head of a flexible plastic lure; and FIG. 8 is a perspective view of a second preferred embodiment for mounting the threaded rattle capsule of this invention on a hook and in the head of a lure, as a trailer.

DESCRIPTION OF THE PREFERRED EMBODIMENTS

Referring initially to FIGS. 1-3 of the drawing, in a preferred embodiment the threaded rattle capsule of this invention is generally illustrated by reference numeral 1. The threaded rattle capsule 1 includes a capsule cylinder 2, having a longitudinal cylinder bore 3 and terminated at one end by a cylinder cone 4, which tapers to a cone tip 5. In a preferred embodiment of the invention cylinder threads 6 spiral along the entire length of the capsule cylinder 2 and extend from the cylinder cone 4 as cone threads 7, as illustrated in FIGS. 1 and 3. Alternatively, only the cone threads 7 may be provided. Three rattle balls 9 are illustrated in spaced relationship in the cylinder bore 3 of the capsule cylinder 2, as illustrated in FIG. 3. Although three rattle balls 9 are illustrated, it will be appreciated by those skilled in the art that more or fewer rattle balls 9 can be utilized, with a minimum of one, according to the knowledge of those skilled in the art. A cylinder cap 11 includes a cap base 12, provided with a cap seal 13 of smaller diameter, which cap seal 13 is designed to insert tightly in the cylinder bore 3 of the capsule cylinder 2, as illustrated in phantom in FIG. 3. In a most preferred embodiment of the invention the cap base 12 is secured to the corresponding end of the capsule cylinder tube by means of a cap hinge 14 and as illustrated in FIG. 1, a cap spiral 17 is secured to or formed integrally with the cap base 12 of the cylinder cap 11, while a cap ring 16 is secured to or formed integrally with the cap base 12 of the cylinder cap 11 illustrated in FIG. 3. As further illustrated in FIGS. 2 and 3, the internal circumference of the cylinder bore 3 is larger than the diameter of the respective rattle balls 9 to facilitate rolling action and contact between the rattle balls 9 inside the cylinder bore 3 when the threaded capsule 1 is retrieved with a fishing lure, as hereinafter further described. The cylinder cap 11 illustrated in FIG. 3 can be closed and sealed in the open end of the capsule cylinder 2 using glue, sonic or hot air welding techniques or other techniques well known to those skilled in the art.

Referring now to FIG. 4 of the drawings, in another preferred embodiment of the invention a cylinder cap 11 is detached from the open end of the capsule cylinder 2 and the cap seal 13 element is threaded for engaging corresponding threads (not illustrated) which may be provided in the open end of the capsule cylinder 2. Furthermore, a cap clip 21 is formed integrally with the cap base 12 of the cylinder cap 11 for receiving the hook shank 26 of a hook 25 and securing the threaded rattle capsule 1 to the hook 25, as hereinafter further described.

Referring to FIG. 5 of the drawings, in yet another preferred embodiment of the invention the cap base 12 element of the cylinder cap 11 is fitted with a cap corkscrew 19 for receiving the eye of a hook (not illustrated) and connecting the cylinder cap 11 and the threaded rattle capsule 1 to the hook for purposes which will be hereinafter further described.

Referring to FIGS. 6 and 8 of the drawings, in still another preferred embodiment of the invention the cap base 12 element of the cylinder cap 11 is fitted with a cap tube 23 of selected length and size for receiving the shank bend 27 of the hook shank 26, as illustrated in FIG. 8. The cap tube 23 may be attached to or integrally formed with the corresponding cap base 12, to facilitate a technique for removably securing the cylinder cap 11 and thus, the threaded rattle capsule 1, to a hook 25 of any description.

Referring now to FIGS. 3 and 7 of the drawings, in a first preferred mounting configuration of the invention the cap base 12 of the cylinder cap 11 which closes the non-entry end of the threaded rattle capsule 1 is fitted with a cap ring 16, which is attached to the hook eye 29 of a hook 25. The hook point 28 and corresponding portion of the hook shank 26 are embedded in the worm body 34 of a flexible plastic worm 33, after the cylinder cone 4 and capsule cylinder 2 of the threaded rattle capsule 1 are threadably inserted in the worm head 36 of the flexible plastic worm 33. The cylinder threads 6 located on the capsule cylinder 2 and the cone threads 7 provided on the cylinder cone 4 serve to secure the threaded rattle capsule 1 in the worm head 36, such that a line 31 may be tied to the hook eye 29 of the hook 25 and the entire hook 25, threaded rattle capsule 1 and flexible plastic worm 33 retrieved through a water body, with the worm tail 35 flexing and undulating to attract fish. Accordingly, under circumstances where a fish strikes the flexible plastic worm 33, misses the hook point 28 of the hook 25 and the flexible plastic worm 33 is stripped from the threaded rattle capsule 1 and the hook 25, the threaded rattle capsule 1 remains in place on the hook eye 29 and a substitute flexible plastic worm 33 can then be quickly reassembled on the threaded rattle capsule 1 and the hook 25 in the configuration illustrated in FIG. 7. Accordingly, the threaded rattle capsule 1 need not be replaced each time a flexible plastic worm 33 is stripped from the hook 25, thereby decreasing the expense of using a rattle capsule-equipped flexible plastic worm or alternative flexible plastic lure.

In a second preferred mounting configuration of the invention the capsule cylinder 2 and cylinder cone 4 of the threaded rattle capsule 1 are threadably embedded in the trailer head 39 of a flexible trailer 38, having streamers 40 extending therefrom. Accordingly, referring to FIGS. 6 and 8, when the cylinder cap 11 is sealed on the open end of the capsule cylinder 2 with the cap seal 13 inserted in the cylinder bore 3, the hook point 28 and shank bend 27 of the hook shank 26 are inserted through the opening in the cap tube 23, to mount the hook 25 in the position illustrated in FIG. 8. A line 31 can then be tied to the hook eye 29 of the hook 25 to retrieve the flexible trailer 38, as illustrated. In an alternative embodiment of the invention the hook 25 can be mounted on a spinner bait or other lure and a flexible trailer 38 mounted on the fixed spinner bait hook 25 to form a trailer behind the spinner bait, as desired. In either case, under circumstances where a fish strips the flexible trailer 38 from the threaded rattle capsule 1, the threaded rattle capsule 1 remains in position on the shank bend 27 of the hook 25 and a substitute flexible trailer 38 can be quickly and easily attached to the threaded rattle capsule 1. The flexible trailer 38 may be provided in a variety of sizes and configurations and is typically constructed of flexible plastic or pork rind, in non-exclusive particular.

Referring again to FIGS. 1, 4 and 5 of the drawings, various exemplary techniques for attaching the cylinder cap 11 to the hook shank 26 of the hook 25 are illustrated. In FIG. 1 the cap spiral 7 engages the hook eye 29 or the hook shank 26 of the hook 25 and removably secures the cylinder cap 11 and hence, the capsule cylinder 2, to the hook 25. Similarly, in FIG. 4 the cap clip 21 engages the hook shank 26 of the hook 25 to removably secure the hook shank 26 on the cylinder cap 11 and the capsule cylinder 2. Similarly, in FIG. 5 the cap corkscrew 19 is used to engage the hook eye 29 or the hook shank 26 of the hook 25 to removably secure the hook 25 to the cylinder cap 11 and capsule cylinder 2.

Furthermore, referring again to FIGS. 1 and 3 of the drawings, the cylinder cap 11 is secured to the open, non-insertion end of the capsule cylinder 2 by means of a cap hinge 14 to better facilitate assembly line insertion of the rattle balls 9 in the respective cylinder bores 3 of the corresponding capsule cylinders 2. Typically, in an injection-molding technique, multiple units of the capsule cylinder 2 may be attached to a connecting lattice (not illustrated) with the open ends of the capsule cylinders 2 facing upwardly and the respective cylinder caps 11 open as illustrated in FIG. 1. A desired number of rattle balls 9 may then be inserted, either manually or automatically, in the open end of the capsule cylinder 2 and the cylinder cap 11 closed on the capsule cylinder 2, with the cap seal 13 inserted tightly in the cylinder bore 3 to seal the rattle balls 9 in the cylinder bore 3. It will be appreciated by those skilled in the art that glue (not illustrated) may be applied to the cap seal 13 and cylinder cap 11 prior to closure of the cylinder cap 11 on the open end of the capsule cylinder 2, in order to secure the cylinder cap 11 tightly to the capsule cylinder 2. Alternatively, a sonic or hot-air weld can be applied to the cylinder cap 11 to seal it on the open end of the capsule cylinder 2, according to the knowledge of those skilled in the art. Other techniques of inserting the respective cylinder caps 11 on corresponding capsule cylinders 2 may be utilized, further according to the knowledge of those skilled in the art without departing from the spirit and scope of the invention.

It will be further appreciated by those skilled in the art that the dimensions of the capsule cylinder 2, including the cylinder cone 4 and the cylinder cap 11, may be varied depending upon the size of the flexible plastic worm 33 and flexible trailer 38 to which the threaded rattle capsule 1 is to be attached. A typical overall length for an average sized threaded rattle capsule 1 is about 24 millimeters and the threaded rattle capsule 1 is typically shaped from an injection-moldable plastic material such as polyethylene, polypropylene or the like.

It will be further appreciated by those skilled in the art that the threaded capsule 1 may be designed without a cap ring 16, cap spiral 17, cap clip 21, cap corkscrew 19 or cap tube 23 for insertion in the worm body 34 of flexible plastic worm 33 or any flexible plastic lure at any point in the worm body 34, as desired. However, a distinct advantage of the threaded rattle capsule 1 is use in the capacity illustrated in FIGS. 7 and 8, such that stripping of either the flexible plastic worm 33 or the flexible trailer 38 from the threaded rattle capsule 1 requires only a replacement of the flexible plastic worm 33 or flexible trailer 38, and not the threaded rattle capsule 1 or the hook 25.

It will be further appreciated by those skilled in the art that the cylinder cone 4 may be provided with threads and the capsule cylinder 2 smooth. Furthermore, the cylinder cone 4 may be hinged to the capsule cylinder 2 under circumstances where it is desired to initially mold or construct the capsule cylinder 2 such that the cylinder cap 11 is molded integrally with the capsule cylinder 2. Accordingly, the rattle balls 9 may then be inserted in the front portion of the cylinder bore 3 of the capsule cylinder 2 and the cylinder cone 4 can be glued or sonic or hot-air welded to the capsule cylinder 2 in the same manner as described above with respect to the cylinder cap 11.

It is understood that the threaded rattle caps 1 can be constructed in any desired color using any size rattle balls 9, depending upon the size of the cylinder bore 3 and the capsule cylinder 2. In a most preferred embodiment of the invention the rattle balls 9 are no. 9 lead shot.

While the preferred embodiments of the invention have been described above, it will be recognized and understood that various modification may be made therein and the appended claims are intended to cover all such modifications which may fall within the spirit and scope of the invention.

Having described my invention with the particularity set forth above, what is claimed is:

1. A threaded rattle capsule for insertion in a lure having at least one hook, comprising a capsule cylinder having a tapered insertion end, insertion threads provided on said tapered insertion end, a cavity provided in said capsule cylinder and at least one rattle ball provided in said cavity, whereby a rattling action is imparted to the lure responsive to insertion of said threaded rattle capsule in the lure.

2. The threaded rattle capsule of claim 1 further comprising cylinder threads provided on said capsule cylinder.

3. The threaded rattle capsule of claim 1 further comprising a cylinder cap closing said cavity on the opposite end of said capsule cylinder from said tapered insertion end.

4. The threaded rattle capsule of claim 3 further comprising hinge means connecting said cylinder cap to said capsule cylinder.

5. The threaded rattle capsule of claim 3 further comprising cylinder threads provided on said capsule cylinder.

6. The threaded rattle capsule of claim 5 further comprising hinge means connecting said cylinder cap to said capsule cylinder.

7. The threaded rattle capsule of claim 1 further comprising hook attachment means carried by said capsule cylinder for securing said threaded rattle capsule to the hook.

8. The threaded rattle capsule of claim 7 further comprising cylinder threads provided on said capsule cylinder.

9. The threaded rattle capsule of claim 8 further comprising a cylinder cap closing said cavity on the opposite end of said capsule cylinder from said tapered insertion end and wherein said hook attachment means is attached to said cylinder cap.

10. The threaded rattle capsule of claim 9 further comprising hinge means connecting said cylinder cap to said capsule cylinder.

11. The threaded rattle capsule of claim 3 further comprising hook attachment means carried by said cylinder cap for securing said threaded rattle capsule to the hook.

12. The threaded rattle capsule of claim 11 wherein said hook attachment means further comprises a ring.

13. The threaded rattle capsule of claim 11 wherein said hook attachment means further comprises a tube.

14. The threaded rattle capsule of claim 11 wherein said hook attachment means further comprises a spiral member.

15. The threaded rattle capsule of claim 12 further comprising cylinder threads provided on said capsule cylinder.

16. A threaded rattle capsule for insertion in a flexible lure having at least one hook embedded therein, comprising a capsule cylinder having a cone-shaped insertion end; insertion threads provided on said cone-shaped insertion end of said capsule cylinder for engaging the flexible lure and retaining said capsule cylinder in the flexible lure; a cavity provided in said capsule cylinder; at least one rattle ball provided in said cavity; cap means closing said cavity at the opposite end of said capsule cylinder from said cone-shaped insertion end for retaining said rattle ball in said cavity; and attachment means carried by said cap means for engaging the hook, whereby a rattling action is imparted to the lure responsive to embedding said threaded rattle capsule in the lure.

17. The threaded rattle lure of claim 16 wherein said threaded rattle capsule is inserted in the head of the lure and said attachment means is secured to the eye of the hook.

18. The threaded rattle lure of claim 17 wherein the lure is characterized by a flexible plastic lure.

19. The threaded rattle lure of claim 16 wherein said threaded rattle capsule is inserted in the head of the lure and said attachment means is secured to the shank of the hook.

20. The threaded rattle lure of claim 19 wherein the lure is characterized by a pork rind streamer.

* * * * *